(No Model.) 2 Sheets—Sheet 1.

C. VAN BUSKIRK.
PHOTOGRAPHIC PRINTING MACHINE.

No. 510,371. Patented Dec. 5, 1893.

Witnesses.
Inventor.
Charles Van Buskirk
by Edwin Planta
attorney.

(No Model.) 2 Sheets—Sheet 2.
C. VAN BUSKIRK.
PHOTOGRAPHIC PRINTING MACHINE.

No. 510,371. Patented Dec. 5, 1893.

Witnesses
Winifred T. Kerwin.
Edward E. Brown

Inventor
Charles Van Buskirk
by Edwin Planta
Attorney

UNITED STATES PATENT OFFICE.

CHARLES VAN BUSKIRK, OF BOSTON, MASSACHUSETTS.

PHOTOGRAPHIC-PRINTING MACHINE.

SPECIFICATION forming part of Letters Patent No. 510,371, dated December 5, 1893.

Application filed January 4, 1893. Serial No. 457,232. (No model.)

*To all whom it may concern:*

Be it known that I, CHARLES VAN BUSKIRK, a citizen of the United States, residing at Boston, in the county of Suffolk and State of Massachusetts, have invented certain new and useful Improvements in Photographic-Printing Machines, of which the following, taken in connection with the accompanying drawings, is a specification.

In machines for photographic printing where the printing upon sensitized paper is required to be done by an instantaneous exposure, the shutters of such machines have hitherto been defective in that they have not been certain in their action and that they exposed one part longer than another thus rendering the shade of the picture somewhat light on one side and comparatively dark on the other.

The object of my invention is to overcome these defects and to produce a shutter for photographic printing machines that will be positive in its action and which will expose all parts equally.

The invention consists of a shutter divided in its center each portion of which is pivoted at its rear to the machine and in the means for instantly opening and closing said shutter as hereinafter fully described and pointed out in the claims.

Figure 1:
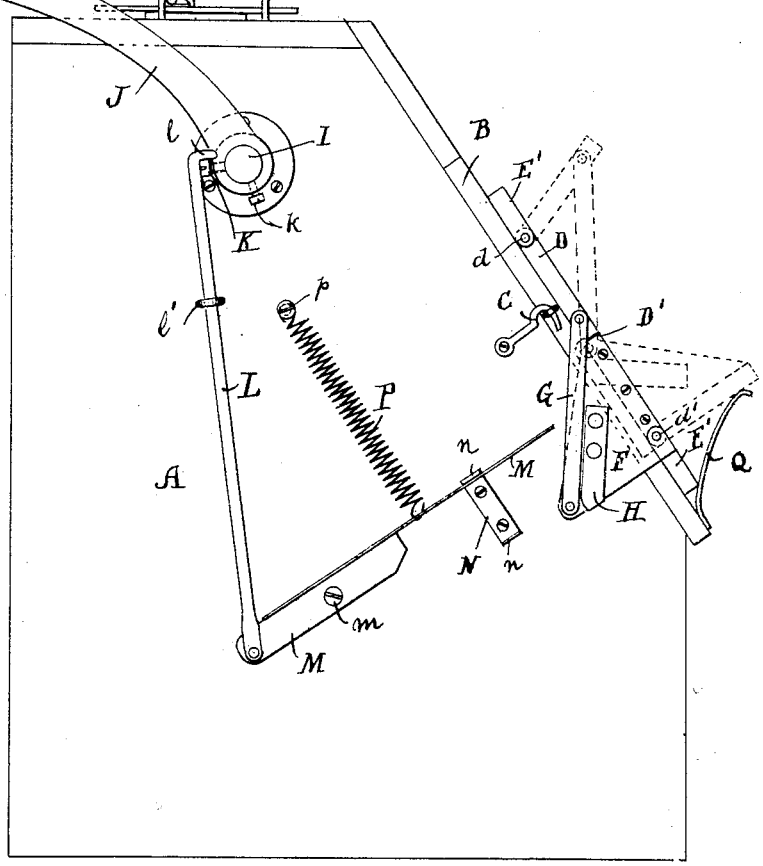
Figure 3:
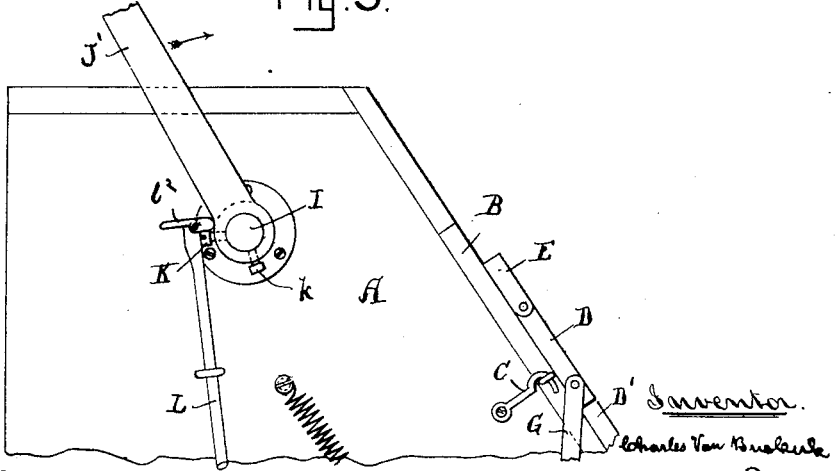
Figure 2:
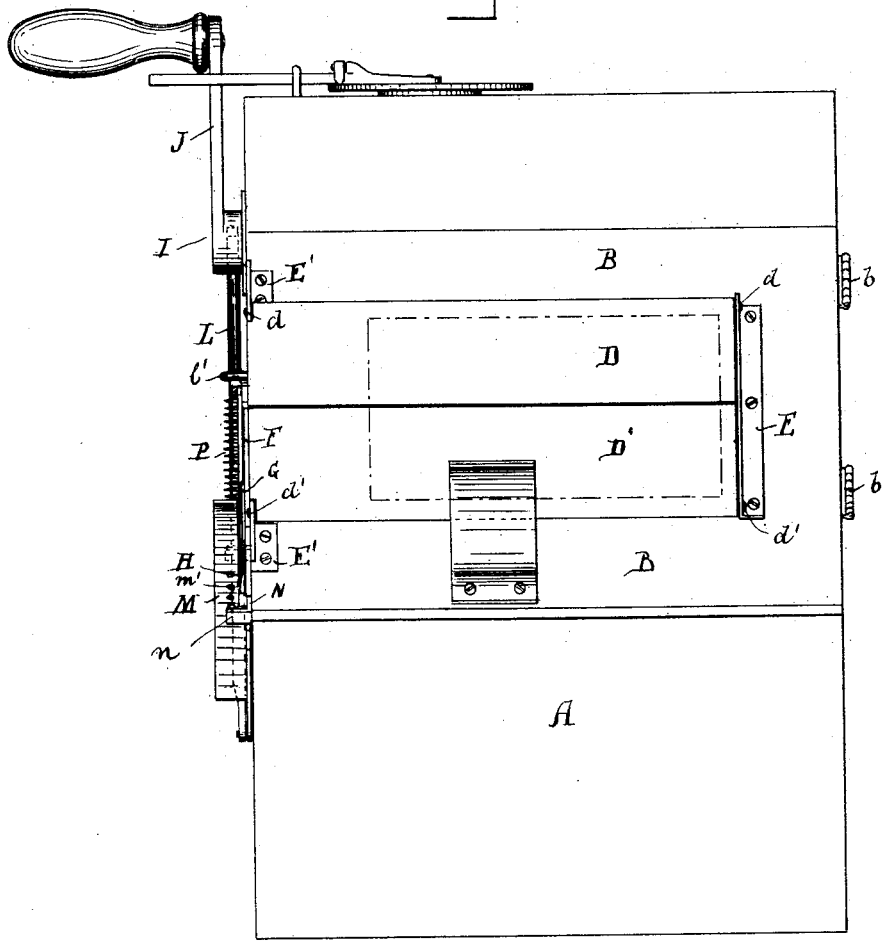

Referring to the accompanying drawings: Figure 1— represents a side view of a photographic printing machine fitted with a shutter embodying my invention. Fig. 2— is a front view of the same. Fig. 3— is a side view showing the shutter operated in a modified manner, viz: by a lever instead of a crank.

A, represents the casing in which the sensitized paper, feed and cutting off mechanism is inclosed.

B, is a cover secured to the casing A by hinges $b$, which cover is formed with an exposure opening as shown in dotted lines in Fig. 2. This cover when in position is secured by a suitable fastening such as a hook and eye as shown at C, Fig. 1.

D, D', are the two portions forming the shutter proper, each of which is pivoted at $d$, $d'$, to brackets E, E', secured to the cover B. To the outer edge of one side of the portion D', is secured a triangular plate F, which is, by a bar G, connected to the upper portion of the shutter D. To the plate F is also secured a spring piece H.

To the shaft I, that operates the internal mechanism, is secured a crank J, by any suitable means such as a screw $k$.

K, is a set screw the head of which projects beyond the hub and when in its normal position is in contact with a lip $l$, on the upper end of a rod L, the lower end of which is pivoted to the end of a lever M, fulcrumed at $m$, to the side of the frame A. The rod L passes through and is guided by an eye $l'$, and the spring lever M, is limited in its movements by a stop piece N, having a projecting ear at each end. The lever M is formed with a series of holes $m'$, for receiving the end of the spring P, so that by attaching the said spring nearer to or farther from the fulcrum $m$, the time that the shutter is left open may be adjusted according to the time it is desired to make the exposure.

P, is a spiral spring for drawing the lever M, to its normal position, and has one end attached to said lever while its upper end is secured to a pin or stud $p$, on the side of the casing A.

Q is a flat spring secured to the lower edge of the cover B, for causing the shutter after being opened to be instantly forced back into a closed position.

The operation is as follows: The crank J, being moved in the direction of the arrow, the head of the screw K, comes into contact with the lip $l$, on the rod L, and draws said rod up, which causes the lever M, to turn on its fulcrum $m$, until the outer end of said lever has passed below the end of the spring H, on the plate F, attached to the lower portion of the shutter, said spring H, yielding to allow the end of the lever M, to pass, and then returns to its normal position so as to stand over the end of the spring lever M, the crank J, by this time having been rotated sufficiently far so that the screw $k$ moves from under the lip $l$. The spring P, quickly draws the lever M, to its normal position, but in so doing the end of said lever comes into contact with the spring H, and throws it upward together with the lower portion D' of the shutter, thus opening it until it strikes against the spring Q, which instantly throws it back again to the closed position. Of course as the upper portion D of the shutter is by the bar G, connected to the plate F, both portions of the shutters operate simultaneously. Thus the exposure is made instantly and there will not be any rebound as the two sections of the shutter section are set at an angle. Their own weight together with the weight of the plate F, and arm G, will cause them to close and be retained in place.

Although I have shown and described the apparatus as being operated by a crank having a rotary motion imparted thereto it is obvious that the same effect may be accomplished by a lever J', having an oscillating motion as shown in Fig. 3, in which all the working parts are of the same construction as before described except the end of the rod L, which is in this case fitted with a pawl $l^2$, fulcrumed to the rod L, in such manner that when the lever is forced in the direction of the arrow, the screw K, will raise the rod L, but when the lever is moved in the opposite direction then the pawl will yield to allow the screw head to pass to the under side. This pawl may be retained in its normal position by a spring but I prefer to have it weighted at its outer end to retain it in position.

What I claim is—

1. In a photographic printing machine, a shutter divided horizontally each section being hinged at its outer end to the front of the machine and connected together to operate simultaneously in combination with a hand lever and connections for throwing both portions of the shutter open and a flat spring against which the lower section of the shutter is thrown said spring causing the lower shutter section to rebound and instantly close the shutter substantially as set forth.

2. In a photographic printing machine a shutter consisting of two parts D, D', each pivoted at its rear to the front of the machine, the portion D', having a plate F, secured thereto, said plate being by a bar G, connected to the portion D, in combination with mechanism for opening same consisting of a hand lever, a rod, spring lever and a spiral spring and a flat spring for closing said shutter all arranged and operated substantially as set forth.

3. In a photographic printing machine a shutter consisting of two parts D, D', each pivoted at its rear end to the front of the machine, the plate F, secured to the portion D', the bar G, connecting the plate F, with the upper portion of the shutter and a spring H, secured to said plate F, in combination with a spring lever M, spring P, rod L, crank or lever J, and a screw $k$, all arranged and operated substantially as set forth.

In testimony whereof I have signed my name to this specification, in the presence of two subscribing witnesses, on this 14th day of December, A. D. 1892.

CHARLES VAN BUSKIRK.

Witnesses:
CHAS. STEERE,
EDWIN PLANTA.